United States Patent [19]

Träger

[11] Patent Number: 5,206,765
[45] Date of Patent: Apr. 27, 1993

[54] PRECISION SLIT OF ADJUSTABLE WIDTH FOR A SPECTRAL INSTRUMENT

[75] Inventor: Rolf Träger, Aalen, Fed. Rep. of Germany

[73] Assignee: Carl-Zeiss-Stiftung, Heidenheim/Brenz, Fed. Rep. of Germany

[21] Appl. No.: 859,102

[22] Filed: Mar. 27, 1992

[30] Foreign Application Priority Data

Apr. 4, 1991 [DE] Fed. Rep. of Germany ....... 4110839

[51] Int. Cl.$^5$ .............................................. G02B 5/00
[52] U.S. Cl. ..................... 359/894; 359/896; 356/333
[58] Field of Search ................ 359/894, 896; 248/276, 248/278, 279, 284, 479, 480, 585, 164, 166, 168, 169, 171, 172, 173, 432; 356/340, 333

[56] References Cited

U.S. PATENT DOCUMENTS

| 2,587,451 | 2/1952 | Farrand | 356/333 |
| 3,840,206 | 10/1974 | Palmer | 248/276 |
| 4,722,500 | 2/1988 | Bray | 248/166 |

FOREIGN PATENT DOCUMENTS 42809 1/1966 German Democratic Rep.

Primary Examiner—Loha Ben
Attorney, Agent, or Firm—Hopgood, Calimafde, Kalil, Blaustein & Judlowe

[57] ABSTRACT

A precision slit of adjustable width in which each slit jaw is guided via at least two guide parallelograms lying opposite each other and in which a single setting member acting jointly on the guide parallelograms of one side and displaceable perpendicular to the direction of movement of the slit jaws is provided for the setting of slit width. In a preferred embodiment, the guide parallelograms are developed as spring parallelograms, an embodiment prepared monolithically from a plate of compliant material and having particular advantages.

13 Claims, 2 Drawing Sheets

PRECISION SLIT OF ADJUSTABLE WIDTH FOR A SPECTRAL INSTRUMENT

BACKGROUND OF THE INVENTION

The present invention relates to a precision slit of adjustable width, wherein the slit is defined by and between slit jaws which are connected for adjustment of slit width via a system of parallelogram linkages.

Illustratively, such precision slits are used as entrance or exit slits in monochromators, spectrophotometers or other spectral instruments which operate in the infrared, visible or ultraviolet range, or in the range of X-radiation. In this connection, it is important to be able to adjust the slits very accurately and in reproducible manner. The adjustment mechanism for the slit jaws must also operate substantially without play and must assure exact parallelism of the slit-defining edges of the slit jaws in every position of adjustment.

U.S. Pat. No. 2,587,451 discloses a slit for spectroscopic instruments in which the slit jaws are arranged on levers which are mounted for guided displacement. In order to adjust slit width, an element is provided which acts via loading springs both against these levers and against an adjustment member. With this solution, precision is limited by the guides of the slit-jaw levers and by friction in the guides.

East German Patent 42,809 discloses a slit for a spectrophotometer in which displacement mechanism for the slit jaws operates without guides. In that solution, each slit jaw is guided by its own parallelogram linkage and is connected to one side of its parallelogram. The displacement mechanism is developed as a lever system which acts on the parallelogram for one of the slit jaws, and this lever system is connected in force-locked manner via another lever system to the parallelogram of the other slit jaw. Since friction occurs at the point of contact of the two lever systems, absolute reproducibility of the adjustment is not possible. Furthermore, such guidance of the slit jaws cannot assure that the slit-limiting edges will be exactly parallel to each other, in every adjusted position.

BRIEF STATEMENT OF THE INVENTION

The object of the present invention is to provide improved structure which will produce a precision slit of adjustable width, wherein adjustment is very accurate and reproducible, and wherein assurance is had in every adjusted position that the slit-limiting edges of the slit jaws remain precisely parallel to each other.

In a preferred precision slit of the invention, each slit jaw is guided by two parallelograms which are arranged on different sides of an elongate arm which mounts the slit jaw. In this way, assurance is had that slit-defining edges of the slit jaws remain precisely parallel to each other, for every position of slit-width adjustment. To set a given adjustment of the slit width, a single setting element is provided which acts simultaneously on all guide parallelograms and against which these parallelograms react in force-locked manner; i.e., spring loading of the parts, to avoid play and to prevent mechanical hysteresis. Slit width is thus set with high precision and reproducibility.

The force-locked connection between the setting element and guide parallelograms can be produced by separate springs. However, it is particularly advantageous to develop the guide parallelograms as spring parallelograms, as for example, from leaf springs.

The invention lends itself to several means of actuating the setting member for achieving desired slit width. And a monolithic construction is disclosed whereby to avoid reliance upon any pivot connections.

DETAIL DESCRIPTION

The invention will be described in detail in conjunction with the accompanying drawings, in which.

Figure 1:
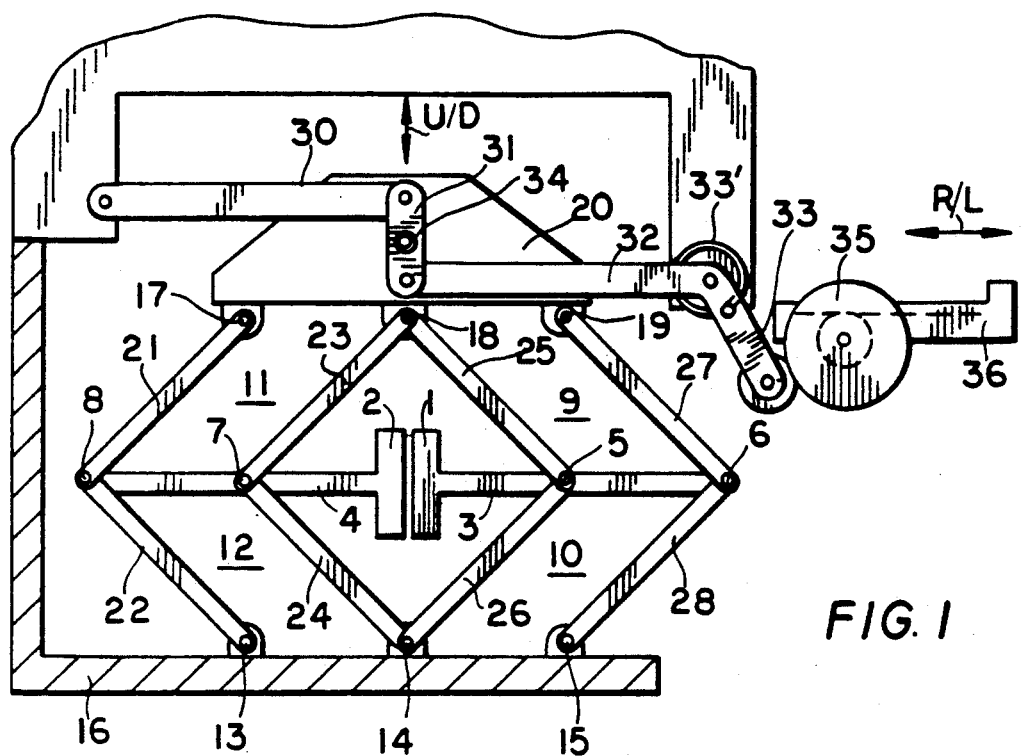
FIG. 1 is a diagram to schematically show a first precision-slit embodiment of the invention, with a lever/linkage mechanism for adjustably setting the width of the slit.

In FIG. 1, the two jaws 1, 2 of a precision slit are shown to be integrally formed with and carried by elongate arms or carriers 3, 4, and each of these carriers has two pivot points—points 5 and 6 on carrier 3, and points 7 and 8 on carrier 4. These pivot points establish connection to linking sides of four guide parallelograms 9, 10, 11, 12. Each slit jaw has an associated two guide paralelograms, arranged on opposite lateral sides of the carriers 3, 4 of the respective slit jaws. Thus, the parallelograms 9 and 10 are associated with the slit jaw 1 having the carrier arm 3.

In addition to the pivot points 5, 6, 7, 8, the guide parallelograms 10 and 12 have three further pivot points 13, 14, 15 at fixed stationary locations spaced along a base 16. Correspondingly, the parallelograms 9 and 11 have three further pivot points 17, 18, 19 of connection to a setting member 20 which is displaceable in the up/down direction indicated by a double-ended arrow (U/D).

The side links (21 to 28) of the guide parallelograms 9 to 12 are advisedly developed with a preloading spring at each point of pivot connection, to base 16, to arms 3, 4 and to the setting member 20, so that points 17, 18, 19 of connection to setting member 20 are in force-locked relation, affording a light resiliently applied load of setting member 20, urging the same in the upward direction. Such preloading springs are not shown but will be understood to normally urge arms 3, 4 and therefore jaws 1, 2 in the direction of jaw closure. Thus, with downward displacement of the setting member 20, the slit-defining edges of jaws 1, 2 are held strictly parallel by their parallelogram suspensions 9, 10 and 11, 12. With subsequent upward displacement of the setting member 20, the pivot points 17 to 19 retain their spring-preloaded (force-locked) relation to the parallelograms 9 to 12, and the slit defined by and between jaws 1, 2 again closes.

In the embodiment of FIG. 1, mechanism for adjustably displacing the setting member 20 comprises a system (30 to 34) of links and levers deriving their positional change from the adjusted displacement of a rack member 36, and an engaged pinion which effects angular displacement of a rotary cam 35. As shown by a double arrow (R/L), such rack adjustment involves right/left displacement. Specifically, the link and lever system shown comprises a bellcrank pivotally mounted to the frame 16 and having a first arm 33 which carries a follower roll that rides the profile of cam 35, there being a torsional spring 33' to continuously load and assure cam and follower engagement. The other arm 32 of the bellcrank is shown to extend substantially parallel to the alignment of the jaw-mounting arms 3, 4 and to be connected to the lower end of a rocker arm 31 which has a pivot connection 34 to a central location on the setting member 20. Finally, a generally horizontal link 30, of preferably the effective length of bellcrank arm 32, has pinned connection at one end to the upper end of rocker arm 31 and, at its other end, to frame structure 16.

The setting of the width of the slit 1, 2 is effected by horizontal (i.e., right-left) displacement of the rack 36, and it will be understood that the profile of cam 35 is designed to effect a linear relation between rack displacement and slit width. For a generous range of adjusted slit width the Watts-type guide-bar suspension involving members 30, 32 and their connection to opposite ends of rocker arm 31 translates into a straight-line vertical path of adjustable displacement of setting member 20 and its point 34 of connection to rocker arm 31, resulting in only one degree of freedom of movement for point 34.

It will be understood that the rack-and-pinion drive of cam 35 is purely illustrative and that other means, such as a worm drive may serve alternatively. The cam 35 is advisedly arranged so as to be replaceable. Still further, it will be understood that setting member 20 can be moved by other means, as for example by an electric-motor drive, as will be described in connection with FIG. 2.

For the rigid bars, links, arms and levers that characterize the embodiment of FIG. 1, it is advisable to develop all joints of the parallelograms 9 to 12 as spring joints, so pretensioned that force-locked (no-play) engagement is assured at all pivot points and, in particular at points 13, 14, 15 of connection to base 16, as well as points 17, 18, 19 of connection to setting member 20. That being the case, upon adjusted vertical displacement of the setting member 20, all guide parallelograms are displaced simultaneously, and without any slippage or play between connected parts of the system.

Figure 2:
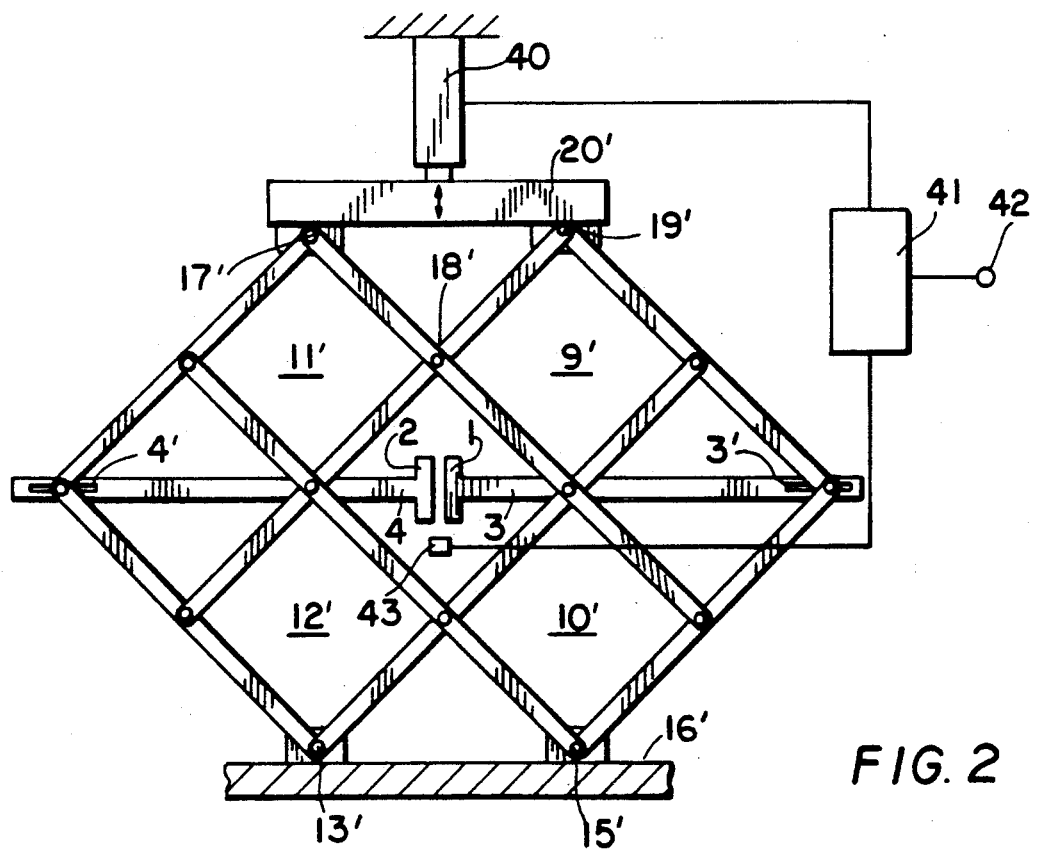
FIG. 2 is a similar diagram to show another embodiment, wherein slit-width setting is electrically adjusted.

In the embodiment of FIG. 2, guide parallelograms 9' to 12' are defined around a central parallelogram by a pantograph structure which is an assembly of a first set of at least four equally spaced parallel rigid strips, to a second and transversely oriented set of at least four equally spaced parallel rigid strips. The strips of these sets intersect and are pivotally connected at all points of their intersection. The slit jaws 1, 2 are again each integrally carried at the end of an elongate arm or carrier 3, 4, both arms being on the same alignment, which extends diametrically through the central parallelogram and the points of intersecting-strip location along this alignment. As shown, the jaw-carrying arm 3 is pivotally connected to the pin which connects intersecting strips that define sides of parallelograms 9', 10', and arm 3 is stabilized on its diagonal alignment by an elongate slot 3' by which it is engaged to the nearby outermost point of pivotally connected strips of the pantograph structure. The arm 4 is similarly connected to the pin which is common to parallelograms 11', 12', and arm 4 is stabilized on the same diagonal alignment by an elongate slot 4' by which it is engaged to the nearby outermost point of pivotally connected strips of the pantograph structure.

A setting member 20' is vertically displaceable with respect to the base frame 16', as suggested by a double-headed arrow. And opposing faces of member 20' and frame 16' establish parallel guides for guide blocks that are individually pinned at strip-interconnection points 17', 19' on an alignment parallel to arms 3, 4, at one lateral offset from arms 3, 4. In similar fashion, guide blocks associated individually with strip-interconnection points 13', 15' on another alignment parallel to arms 3, 4 are slidable along the guide surface of base 16'. As with the structure of FIG. 1, all points of pivotal connection will be understood to be force-locked by spring action to eliminate play and mechanical hysteresis.

The arrangement of FIG. 2 illustrates an alternative embodiment for displacing the setting member 20' to achieve adjusted spacing of the slit gap determined by resulting horizontal relative movement of the jaw-supporting arms 3, 4. According to this embodiment, an electric-motor driven vertical-positioning means 40 (which may be an electric motor with speed-reducing means, or which may be a piezoelectric device) is under control of electronic circuit means 41, with provision at 42 for selective setting of a given slit width at 1, 2. And a gap-sensing transducer 43 is shown for providing to circuit 41 a feedback signal which reflects actual slit width, such that the predetermined slit width can be automatically achieved and maintained, i.e., when the actual slit width is electronically determined to agree with the desired slit width, selected at 42. It will be understood that the automatic gap-positioning and monitoring system of FIG. 2 can equally well serve similar functions for the other embodiments herein described for the present invention.

Figure 3:
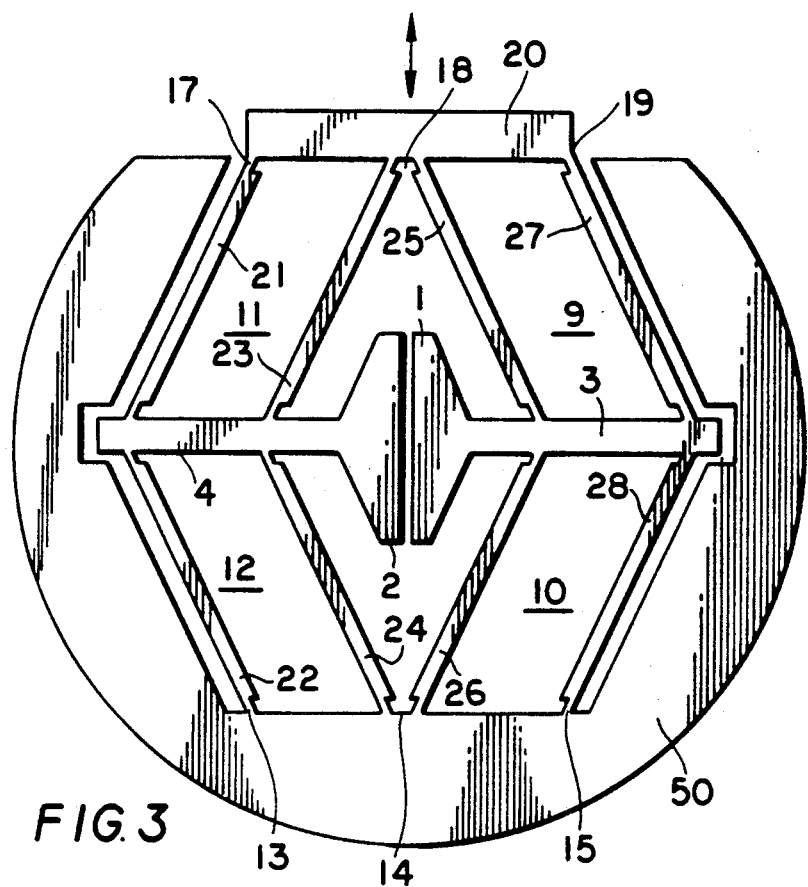
FIG. 3 is a diagram to show a third embodiment in which elements of the slit and of its guide parallelograms are monolithically related.

The embodiment of FIG. 3 involves no pivotally connected parts, in that the structure is monolithic, being cut from a single plate 50, as of spring steel. The elements resulting from the cutting, which may be by EDM (electric-discharge) machining, are given the numerical designations of FIG. 1, because the correspondence between elements is so visually apparent. Specifically, the outer confines of plate 50 are cut to a circular profile that is truncated by an upper local chord, at the elevation of the setting member 20. The lower oppositely inclined pairs of legs 22, 24 and 26, 28 are locally necked-down for compliantly yielding equivalence to pivotal connection to the base 50 at 13, 14, 15. The lower guide parallelograms 10, 12 are completed by similarly necked-down connection of the leg pairs 22, 24 and 26, 28 to spaced locations along arms 3, 4. In similar fashion, the leg pairs 21, 23 and 25, 27 of the upper parallelograms are integrally formed with the setting member 20, for compliant, effectively local pivot action, at spaced points 17, 18, 19 along the setting member.

Significantly, the embodiment of FIG. 3 is totally free of play and, for the limited range of deflections needed for a useful range of controlled (i.e., selected or adjusted) slit width at 1, 2, the structure is also free of mechanical hysteresis. The structure therefore lends itself to highly precise slit-gap setting and maintenance, with great reliability of reproduceability, between strictly parallel slit-defining edges. This is of particular importance in instruments operating in the X-ray range. Still further, the frame which results from cutting from plate 50 almost totally surrounds the operative elements of the device, with only enough clearance to permit the desired range of operation, thus mechanically protecting the same from excessive strain or damage from inadvertent or other mechanical impact.

Figure 4:
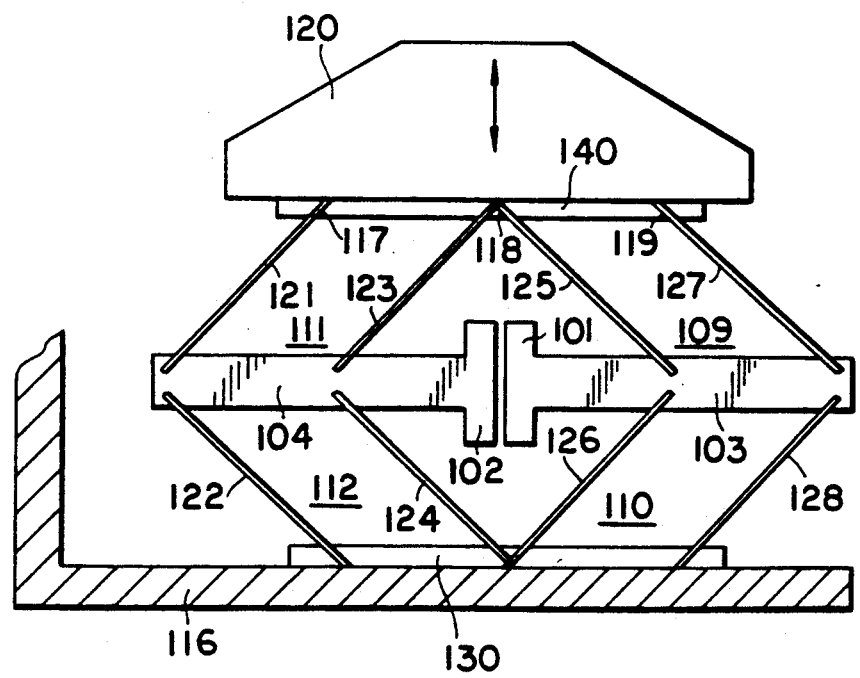
FIG. 4 is a diagram to show a fourth embodiment in which certain elements of the guide parallelograms are leaf springs.

The embodiment of FIG. 4 illustrates another system to avoid pivotally connected parts and resulting mechanical hysteresis. In this embodiment, parts again correspond to the configuration of FIG. 1, and they are therefore given corresponding reference numbers, in a 100-series. All inclined leg pairs (121, 123; 125, 127; 122, 124; and 126, 128) which are associated with and complete connections of setting member 120 and of base 116 to the respective jaw arms 103, 104, are individual leaf springs. As shown, the leaf springs 122, 124 engaged to arm 104 are bonded in spaced grooves that are either milled or EDM-machined in arm 104; and similar grooves in a pedestal 130 fixed to or integral with base 116 receive bonded seating of the opposite ends of leaf springs 122, 124. Similar anchorage of the ends of all remaining leaf springs completes the suspension of arm 103 with respect to base 116, and at opposite lateral offset from arms 103, 104, further leaf springs 121, 123, 125, 127 have corresponding connections to a pedestal 140 at the underside of setting member 120. The difference between FIGS. 3 and 4 lies in the fact that vertical deflections of involved guide parallelograms 109 to 112 in FIG. 4 are characterized by compliant leaf-spring bending that is distributed along the length of each leaf spring, whereas in FIG. 3, compliant bending deflections are essentially limited to the locally weakened, necked-down regions of all leg connections, to base 50, to arms 3, 4, and to setting member 20. Both embodiments lend themselves to high precision and reproduceability of slit-width determination, for displacement ranges of setting-member displacement which may be only 1-mm, or as much as 5-mm. Every slit width within such ranges can be established with great accuracy.

What is claimed is:

1. A precision slit of adjustable width for spectral instruments in which adjustably spaced slit jaws are guided for a first direction of displacement by a linkage system developed as a parallelogram, characterized by the fact that each slit jaw (1; 2) is carried by an arm (3; 4) which is pivotally connected with at least two guide parallelograms (9, 10; 11, 12) arranged on opposite lateral sides of the arm (3; 4) the arm connection to said at least two guide parallelograms forming one common side of said at least two parallelograms, and that for adjustable setting of slit width there is provided a setting member (20) which acts jointly on the guide parallelograms (9, 11) of one lateral side of the arm, said setting member being connected in force-locked manner with each of the guide parallelograms on said one side and said setting member being displaceable perpendicular to said first direction of displacement.

2. A precision slit according to claim 1, characterized by the fact that the guide parallelograms (9-12) are developed as spring parallelograms.

3. A precision slit according to claim 2, characterized by the fact that the guide parallelograms (9-12) consist of leaf springs.

4. A precision slit according to claim 1, characterized by the fact that the arms (3, 4) which carry the slit jaws (1, 2) align with a diagonal of an articulated parallelogram, the sides (23, 25, 24, 26) of said parallellogram being pivotally connected to each other, and each thus connected side of said parallelogram serving each thus side of a different one of said guide parallelograms (9, 10, 11, 12), with remaining sides of said guide parallelograms positioned outside the articulated parallelogram.

5. A precision slit according to claim 1, characterized by the fact that each arm (3, 4) has two spaced points of pivotal connection to two side members of each of the at least two guide parallelograms associated therewith, that a first elongate member parallel to and laterally offset from said arms has such spaced pivotal connection to some of said side members at one lateral offset from said arms as to complete at least one guide parallelogram for each of said arms, and that a second elongate member parallel to and laterally offset from said arms has such spaced pivotal connection to others of said side members at the other lateral offset from said arms as to complete at least another guide parallelogram for each of said arms.

6. A precision slit according to claim 5, characterized by the fact that said first elongate member and its said points of pivotal connection are fixed in space and that said second elongate member and its points of pivotal connection are displaceable perpendicular to the elongate direction of said arms.

7. A precision slit according to claim 1, characterized by the fact that for adjustable setting of slit width there is provided a mechanical lever system (30-33) for effecting linear displacement of the setting member (20) perpendicular to the elongate direction of said arms.

8. A precision slit according to claim 7, characterized by the fact that said lever system includes cam-and-follower means having a profile for linearizing displacement of said setting member (20).

9. A precision slit according to claim 1, characterized by the fact that motor-operated drive means (40) is provided for displacement of the setting member (20).

10. A precision slit according to claim 9, characterized by the fact that motor operation is controlled via a position-control circuit (41) which is responsive to a detector (43) of slit width.

11. A precision slit according to claim 1, characterized by the fact that the guide parallelograms (9 to 12), the slit jaws (1, 2) and their arms (3, 4) are formed monolithically from a single plate (50) of compliant material.

12. A precision slit of adjustable width for spectral instruments in which adjustably spaced slit jaws are guided for a first direction of displacement by a linkage system developed as a parallelogram, characterized by the fact that each slit jaw is carried by an arm which is pivotally connected with at least two guide parallelograms arranged on opposite lateral sides of the arm, said guide parallelograms being defined by a pantograph assembly of first and second intersecting sets of at least four equally spaced elongate parallel members, there being a pivotal interconnection of members of said sets at each intersection, whereby a diagonal alignment exists for at least four of said pivotal connections and diagonally through at least three of said parallelograms, said slit jaws confronting each other within the central one of said three parallelograms and their respective arms each having pivotal connection at the respective two spaced member intersections at one of the remaining parallelograms on said alignment, each of said arms having a longitudinal slot at its pivotal connection at one of its said two member intersections, first and second elongate guide members establishing guide alignments that are parallel to each other and to said arms and at opposite lateral offsets from said arms, first individual slides having engagement to said first guide member and connected to each of two pivotally connected intersections on an alignment parallel to said arms and at one lateral offset from said arms, second individual slides having sliding engagement to said second guide member and connected to each of two pivotally connected intersections on an alignment parallel to said arms and at the opposite lateral offset from said arms, and slit-width adjustment means including means for displacing at least one of said guide members in the direction perpendicular to said diagonal alignment and with respect to the other of said guide members.

13. An adjustable-width precision slit for a spectral instrument wherein each of two jaws has (i) a slit-defining edge and (ii) an associated elongate mounting arm which extends perpendicular to and away from its associated slit-defining edge, and means mounting said jaws via said arms with the respective slit-defining edges in adjustably spaced parallel confronting relation; said mounting means comprising a first two like parallelogram linkages wherein one of said arms is connected to form one link in common to both said first parallelogram linkages, with the parallelograms of said first linkages extending in opposite directions laterally of said one arm, a second two like parallelogram linkages wherein the other of said arms is connected to form one link in common to both said second parallel linkages, with the parallelograms of said second linkages extending in opposite directions laterally of said other arm; a first rigid tie member at lateral offset from and parallel to said arms and connected to form one link in common with one of the parallelograms of each of said first and second parallelogram linkages, a second rigid tie member at opposite lateral offset from and parallel to said arms and connected to form one link in common with the other of the parallelograms of each of said first and second parallelogram linkages; and adjustable means reacting between said rigid tie members and in the direction perpendicular to said arms for adjusting the spacing between tie members and thereby also effecting an adjustment in the spacing between slit-defining edges of said jaws.

* * * * *